June 21, 1927.

T. MIDGLEY 1,633,342

PULLEY BAND TIRE CONSTRUCTION

Original Filed Dec. 13, 1921

INVENTOR
THOMAS MIDGLEY
BY
Edward Taylor
ATTORNEY

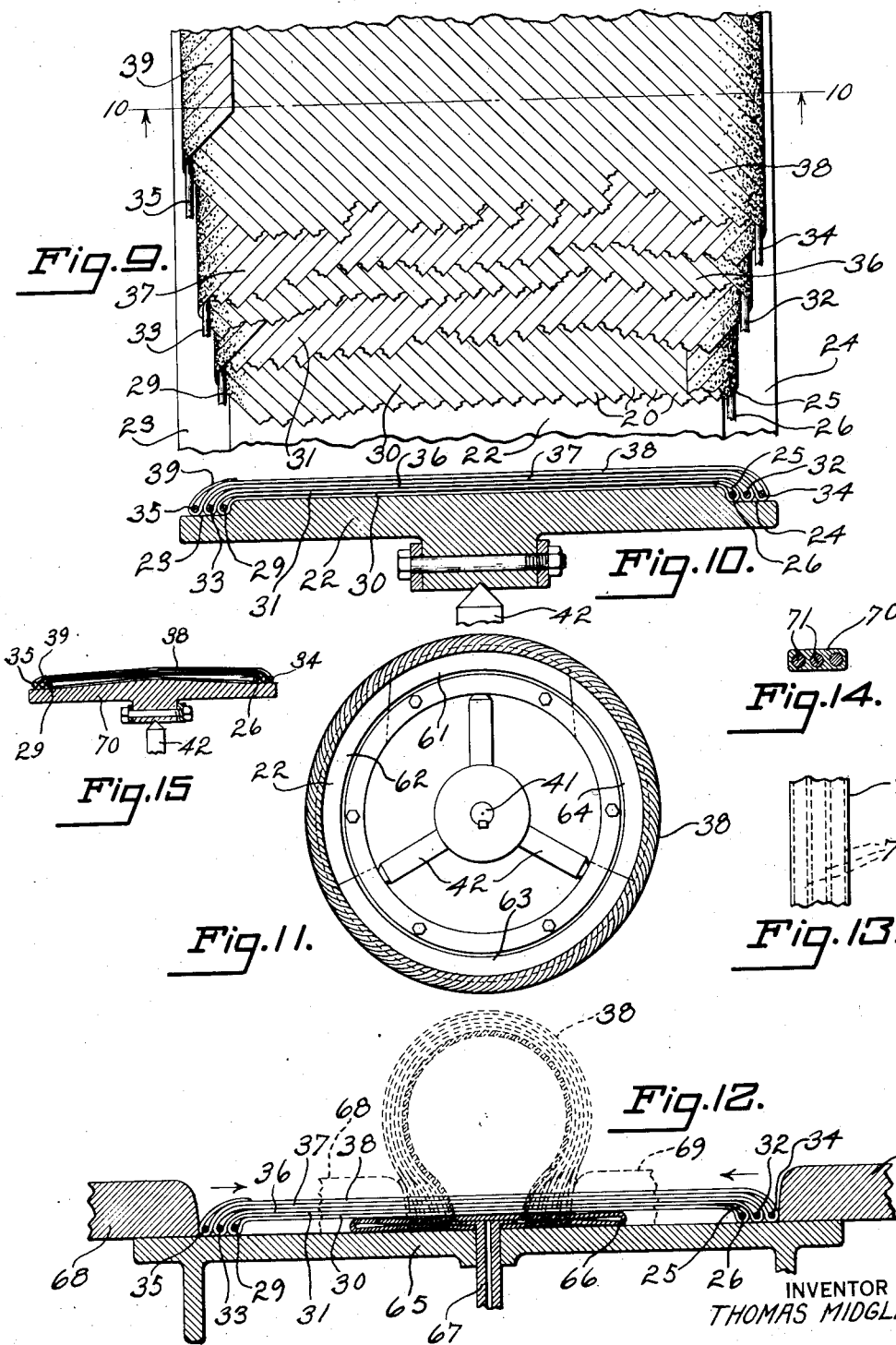

Patented June 21, 1927.

1,633,342

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

PULLEY-BAND-TIRE CONSTRUCTION.

Application filed December 13, 1921, Serial No. 522,090. Renewed December 10, 1926.

My invention relates to what is ordinarily known as the pulley band method of constructing tire casings and similar articles, and deals particularly with improvements on methods and machines for constructing tire casings according to this method, and to the pulley band tire constructed thereby.

By the term "pulley-band" tire I refer to a tire which is first constructed in cylindrical form rather than in the horse-shoe cross-section in which tires are usually built, and which is afterward expanded from the cylindrical to the horse-shoe form, usually by fluid pressure, before vulcanization. Prior methods of building these cylinder or pulley-bands are of two types, consisting either in winding bands of tire building material circumferentially around a cylindrical form or in winding a single cord or flat strip back and forth between spaced supports. My invention has for its objects the provision of a new method of building the carcass portion of a pulley-band tire by which it can be made much more rapidly and with better control of the tension and position of the cord members than by prior methods.

I will now describe my invention with particular reference to the accompanying drawings, in which, Fig. 1 is a diagrammatic view showing a cylindrical building support upon which a pulley band carcass is to be built, and illustrating the initial stage in the application of a ply of building material thereto;

Fig. 9 is a fragmentary plan view of a pulley band carcass constructed according to my invention, the plies being broken away to show the construction;

Fig. 10 is a section on line 10—10 of Fig. 9;

Fig. 11 is a side view of a building form with a pulley band carcass thereon, on a smaller scale than Figs. 9 and 10;

Fig. 12 is a diagrammatic section illustrating one method of expanding the pulley band to horse-shoe cross-section;

Fig. 13 is a detail of one type of cord member which may be used in building the carcass;

Fig. 14 is a section thereof, and

Fig. 15 is a section corresponding to Fig. 10 showing a modified form of building support.

Figure 1:
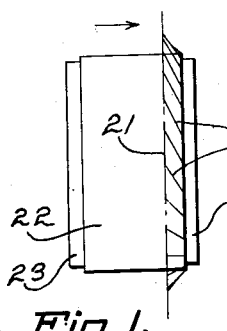

In practicing my invention I provide a circumferential series of cord members 20 and direct them through suitable guiding means in a guiding circumference 21 concentrically disposed with relation to a building support 22. This support, which is preferably constructed as a cylindrical drum, has bead supporting portions 23 and 24, preferably of a smaller circumference than the body of the drum to give a seat for the bead portion of the casing. The series of cord members are secured adjacent one of the bead supports, 24 as shown, by clamping to the drums or by folding the ends of the members at 25 around an annular anchorage 26 (Figs. 9 and 10). The cord members are preferably anchored while extending angularly from the guiding circumference to the drum, as in this position they will lie substantially as in the built-up carcass, but if desired they may be first anchored and then shifted to their angular position. The drum and guiding circumference are then moved axially with respect to each other, as by moving the drum in the direction of the arrow in Fig. 1, until a complete layer of cord members has been laid on the drum and the parts are in substantially the position of Fig. 3. During this movement the drum and guiding circumference may be given a relative rotation, as by rotating the drum in the direction of the arrow in Fig. 2, in such a manner that the cord members are caused to lie across the surface of the drum in a diagonal path.

Figures 2, 3:
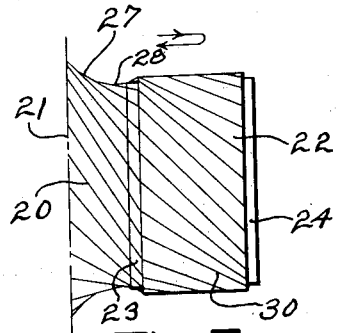
Fig. 2 is a diagrammatic view taken from the right of Fig. 1.
Fig. 3 is a view similar to Fig. 1 showing the first ply completely in place.

As shown in Fig. 3 the relative movement of the drum and the guiding circumference may be continued beyond the point at which the laying of the cord members once across the drum is completed. The angular position of the cord members in this position causes the series to define or bound a curved surface 27 between the bead support 23 and the guiding circumference 21. This surface is of a type known to mathematicians as a warped or ruled surface of revolution, and the curved nature of the surface is caused by the angular position of the members, each member lying in a straight path between the bead support and the guiding circumference. Considering the surface as a whole, its curvature serves two purposes. In the first place, the curve causes the cord members to lie closely upon the drum, and to hug the edge of the drum adjacent the bead support 23. In the second place, the natural curvature of the surface causes it to present a constricted portion 28 for the application of an annular anchorage 29 encircling the series of cord members. This anchorage is preferably constructed out of inextensible wire, and, after application around the series of cord members, has its ends joined as by soldering, brazing, welding, twisting, or by a suitable clip connection. The annular anchorage so caused to encircle the series may be located in place over the bead support 23, or it may be left to be positioned by the tension of the members during the operation of laying the succeeding ply.

Figure 4:
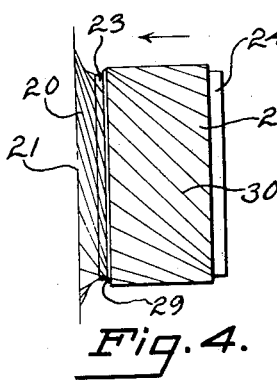
Fig. 4 is a similar view showing the application of a bead anchorage and the position of the cord members just prior to the commencement of the laying of a second ply.
Figure 5:
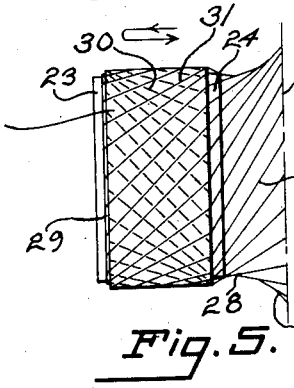
Fig. 5 is a view corresponding to Fig. 3 but showing the completion of the second ply.

The drum is then moved in the direction of the arrow in Fig. 4 so as to carry it through the plane of the guiding circumference. During the first part of this movement the drum is preferably rotated in the reverse direction to that shown by the arrow in Fig. 2, so that the excess length of the cord members is taken up without changing the angle that they assume between the drum and the guiding circumference. The cord members are uniformly drawn back through the guides under a steady tension during this portion of the stroke. When the bead support 23 has reached a position substantially in the plane of the guiding circumference the rotation of the drum in its original direction is resumed so that the cord members will be laid in a second ply or traverse across the drum in angular relation with respect to the first ply. This condition is illustrated in Fig. 5, where the first ply 30 is indicated in dotted lines underneath the second ply 31. After this second ply is so laid an annular anchorage 32 is applied around the series in the same manner in which the first anchorage was applied.

In Figs. 1 to 5 I have illustrated the application of but two plies, but it will be understood that the alternate operations of transposing the planes of the drum and the guiding circumference and encircling the series with an anchorage may be repeated until as many plies as desired have been laid. It is desirable to keep the cord members taut or free from slack, with such tension as may be desired, during the entire building operation, both because they are more accurately located under this condition and because when cord members coated with rubber of a tacky or adhesive consistency are used slackness will tend to permit the sticking of one to another. By the method of laying the cord members disclosed each individual member may be uniformly tensioned, so that every cord member in the completed tire is in the best condition to assume its share of the strain.

In Figs. 9 and 10 I have illustrated a five ply tire carcass built on a drum in the manner described. Plies 30 and 31 are laid as described above, but the cord members forming these plies are reversely folded in zigzag paths back and forth across the carcass around anchorages 32, 33, 34 and 35, to form plies 36, 37 and 38, the members being folded around anchorage 35 at 39 to secure them in place.

Figure 7:
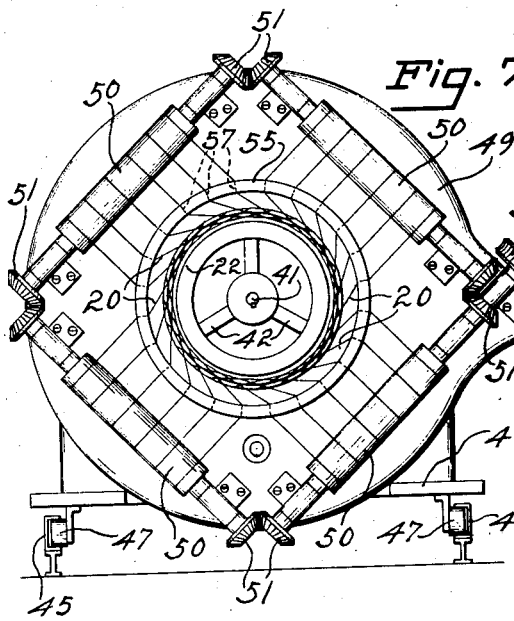
Fig. 7 is an end view of a hand-operated machine for building tires according to my improved method.
Figure 8:
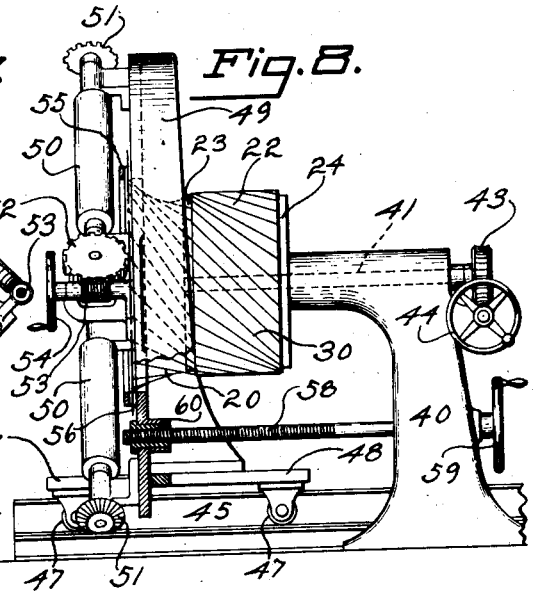
Fig. 8 is a side view thereof.

In Figs. 7 and 8 I have shown an illustrative form of apparatus for forming tire casings according to the method described above. In this appliance, which is in the nature of hand operated guides for facilitating and increasing the accuracy of the positioning of the cord members, I have illustrated the reciprocating motion as being furnished by the guide, instead of by the drum as described above. It will readily be recognized, however, that this is an optional inversion. The rotary motion has been shown as furnished by the drum although it might be furnished by the guide.

The drum 22 is supported from a stationary standard 40. A shaft 41, passing through the upper portion of the standard, carries the drum by means of a spider construction 42, and is rotatable by means of a worm wheel 43 engaging a worm on the shaft of a hand wheel 44. By this means the angular position of the drum may be varied. Running on rails 45, preferably constructed as channels so as to provide a holding-down means for the carriage, is a carriage 46 having rolls 47 engaging the rails. This carriage is provided with a cutaway portion 48 permitting it to clear the standard 40, and carries a frame 49. This frame carries a series of reels 50, four in number as shown, suitably journaled thereon and preferably connected together for simultaneous rotation by gearing 51. On the shaft of one of the reels is a worm wheel 52 meshing with a worm 53 on the shaft of a hand wheel 54. The reels 50 carry the cord members 20, a small number only being shown (but as many as desired may be used up to a number to cause the members to lie as in Fig. 9), which pass from the reels to an annular guide 55. The guide is mounted on the frame and its center line 56 (see Fig. 8) corresponds to the guiding circumference 21 (see Figs. 1 to 6). Holes 57 in the guide serve to direct the cord members and preserve them in their spaced relation. These holes may be provided with suitable rollers or other anti-friction devices if desired. By rotating the hand wheel 54 in one direction the cord members are unwound from the reels so that they may be drawn through the guide, and by rotating it in the other direction they will be drawn back. A screw 58, provided with a hand wheel 59, meshes with a nut 60 in the frame 49 and serves to move carriage 46, together with the reels and guide, toward or away from the drum.

The operation of this appliance will be apparent from the above, but may be briefly summarized here. Cord members 20 are led from the reels through the guide 55 and are attached to the drum in any convenient manner. One manner of accomplishing this is by folding them around an anchoring wire positioned adjacent one side of the drum. This may conveniently be done while the relative positions of the drum and guide are such as shown in Figs. 1 and 2, as in these positions the determination of the proper position of the cord members is somewhat easier. Assuming the cords to be initially adjusted in position, the drum and guide are separated through the medium of hand-wheel 59 until they reach the position of Fig. 3. During this motion of separation the drum is rotated by hand wheel 44 and cords are unwound from the reels by hand wheel 54 so as to permit them to be drawn through the guide under tension. When the parts are in the position of Fig. 3, an anchoring member is applied over the series of cords as previously described, and the guide moved to the position of Fig. 4 by hand wheel 59. In this movement the drum is rotated in the reverse direction, the original direction of rotation being resumed as the guide proceeds from this position to that of Fig. 5. During the motion from the position of Fig. 4 to that of Fig. 5 the cords are kept taut at all times by rotating hand-wheel 54, the cords being drawn back through the guide until they are in substantially the plane of the guide (that is, when the guide is just starting to pass over the drum) and being fed out through the guide during the remainder of the stroke. This sequence of operations may be repeated until the desired number of plies has been laid on the drum.

After the carcass is completed one manner of severing the elements to permit the removal of the finished carcass without disturbing the relationship between the several elements is to secure around the series of cords an adhesive strip of rubberized fabric. The cords may then be cut between the drum and the strip, the strip serving to prevent the cords becoming tangled or stuck together and affording a ready means of holding them during the process of securing them to a succeeding drum.

Figure 6:
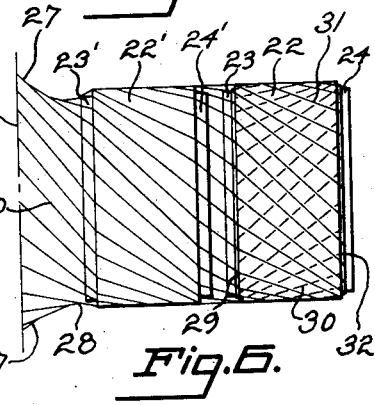
Fig. 6 is a view illustrating one method of transferring the cord members from one building support to another.

In place of this method of handling the cord members after the building of one carcass I prefer to transfer them directly from one drum to another before they are severed, in the manner indicated in Fig. 6. According to this method a fresh drum 22', carried preferably on a standard similar to standard 40 but oppositely disposed, is mounted in axial alignment with the drum 22 and moved in close proximity thereto. The two drums are then moved together away from the guiding circumference so that the cord members 20 are drawn over the surface of the second drum. A bead anchorage is then placed over the cords on the bead support 24', or the cords are secured to the drum 22' in any other suitable way, and the cords are then severed between the two drums. The first drum 22 can now be removed from the machine and the building of a carcass on the second drum 22' completed. A more complete description of this manner of transferring will be found in my application filed December 3, 1921, Serial No. 519,583, Patent No. 1,603,857, Oct. 19, 1926.

The pulley band carcass so constructed may be expanded to tire form in any way found desirable. Several methods have been previously proposed for this purpose. I have illustrated a method of expansion in which an inflatable air bag is employed, this being the method commonly employed with pulley band casings of other constructions. The operation of expanding the carcass is preferably carried out on another support from that upon which the elements are laid up into carcass form, and for this purpose the drum 22 is preferably constructed in sections 61, 62, 63 and 64, whereby the drum may be disassembled for removal from within the carcass.

The carcass may now be mounted on a drum 65 upon which an air bag 66 is carried, as shown in full lines in Fig. 12, and air admitted to the bag through nipple 67, thereby causing the carcass to expand into the condition shown in dotted lines. During this expansion process the bead edges of the carcass may be forced towards each other by annular members 68 and 69, or may be left to be drawn in by the expanding carcass as it changes its shape. After the carcass is expanded it may be allowed to set in this position until the rubber with which it is impregnated has lost its tendency to return to the flat form, and may then be completed by vulcanization, or it may be vulcanized while supported by the air bag as soon as it has been expanded. The covering rubber, such as the tread and sidewalls, may be added either before or after the carcass has been expanded as may be found desirable.

It may sometimes be found desirable to vary in different plies the angle at which the cord members cross the carcass either to compensate for the different length of path in the different plies of the blown up carcass or to equalize the elasticity of the various plies. If such a change in angle is desired my method affords a ready way of attaining it. The angle at which the cord members are laid across the carcass is determined by the relative angular motion given to the drum and the guided portion of the members, and it will be apparent from the description given above the way in which the cord members are laid up into carcass formation that the relative angular motion may be varied in successive plies to produce any desired condition of angularity.

In Figs. 13 and 14 I have illustrated the form of building element or cord member that I prefer to use. This element comprises a matrix of rubber 70 in which is embedded a plurality of parallel cords 71, the whole forming a flat band which is in some cases more readily handled than a round cord and which also permits of the incorporation into the carcass as the elements are laid up of a quanity of rubber, carried by the building elements, which will be sufficient to close all spaces between adjacent elements and to provide bonding rivets or projections from one ply to another. In the building of a pulley band carcass it may be found that the elements tend to crowd together in their intermediate portions after expansion, due to a change in their angular position when the central portion of the carcass is stretched. Whether this crowding will take place will depend upon the angle at which the elements are originally laid, and thus upon the choice of the tire builder depending on factors of carcass shape, etc., which may be governed by other considerations than my present invention. In cases where this crowding at the center of the tread does occur, however, it may be found desirable to space the elements slightly as they are laid, relying on the crowding to bring them together at the tread, and upon the excess rubber carried by the flat elements to close the spaces between adjacent elements near the bead portions. In case these flat elements are used it is desirable to guide them from the guiding circumference with their flat sides extending substantially in the plane of the circumference, as in that position they lie in a better manner where they pass under the anchorages.

In Fig. 15 I have shown a modified form of building drum, in which the necessity of using shouldered bead supporting portions 23, 24 is avoided. In this case the drum 70 is formed in the transverse form of a double cone similar to a crowned pulley, tapering from the center to the edges. The wires 26 and 29 which are first applied will be located by the taper, sliding up the crowned surface of the drum until the internal diameter of the wire with the cord material folded around it corresponds with the diameter of the drum. The succeeding wires will be located by the wires previously applied.

The general method of building tire casings by the use of a circumferentially guided series of cord members, the method of transferring the cord members from one support to another before severance, and the broader features of mechanism suitable for attaining these purposes, are fully described and claimed in copending application. It is my intention in this application to claim as broadly as the law will permit the manufacture of cylindrical or pulley band casings in the manner described.

Having thus described my invention, I claim:

1. The method of building a tire casing, comprising; holding a circumferential series of cord members adjacent an annular bead support, carrying said series to another bead support axially spaced from the first-named support, securing the series adjacent the second support, repeating the carrying and securing steps until a pulley-band carcass of the desired number of plies is formed, and expanding the pulley-band carcass into tire form.

2. The method of building a tire casing, comprising; holding a circumferential series of cord members adjacent an annular bead support, carrying said series diagonally to another bead support axially spaced from the first-named support, securing the series adjacent the second support, repeating the carrying and securing steps until a pulley band carcass of the desired number of plies is built up with each individual cord member progressing circumferentially and from each course to the next in a zig-zag manner, and expanding the pulley-band carcass into tire form.

3. The method of building a tire casing, comprising; holding a circumferential series of cord members adjacent an annular bead support, carrying said series to another bead support axially spaced from the first-named support, encircling the series adjacent the second bead support with an annular anchorage, repeating the carrying and encircling steps alternately so that the cord members pass from each ply around an anchorage and into the next ply and until a pulley-band carcass of the desired number of plies is built up, and expanding the pulley-band carcass into tire form.

4. The method of building a tire casing, comprising; holding a circumferential series of cord members adjacent an annular bead support, carrying said series to another bead support axially spaced from the first-named support, encircling the series adjacent the second bead support with an annular anchorage, repeating the carrying and encircling steps alternately in such a manner that the cord members pass from each ply around an annular anchorage and into the next ply in a zig-zag course along the carcass structure, and expanding the pulley-band carcass into tire form.

5. The method of building a pulley-band tire carcass, comprising; providing spaced bead supports affording sufficient axial distance between them for the width desired in the unexpanded pulley-band carcass, guiding a circumferential series of cord members from a circumference greater than that of the bead supports, holding the series of cord members adjacent one of said supports, repeatedly transposing the planes of the supports and the guiding circumference while supplying the cord members in a taut condition through said circumference, alternately therewith securing the series adjacent one or the other of said supports until a pulley-band carcass of the desired number of plies is built up, and expanding the pulley-band carcass into tire form.

6. The method of building a pulley band tire carcass, comprising; providing spaced bead supports affording sufficient axial distance between them for the width desired in the unexpanded pulley-band carcass, guiding a circumferential series of cord members in taut condition from a circumference greater than that of the bead supports, holding the series of cord members adjacent one of said supports, repeatedly transposing the planes of the supports and the guiding circumference and concurrently therewith causing a relative rotation between the supports and the guiding circumference, whereby the cord members are laid diagonally from one support to the other in a zig-zag path, alternately with said transpositions securing the series adjacent one or the other of said supports, and expanding the pulley-band carcass so formed into tire form.

7. The method of building a pulley band tire carcass, comprising; guiding a circumferential series of cord members in taut condition through a guiding circumference, securing said series to a substantially flat drum co-axial with the circumference and of sufficient width to support a pulley-band carcass in flat condition, repeatedly causing relative axial reciprocation between the guiding circumference and the drum whereby the drum is located first on one side and then on the other of the guiding circumference, alternately with said reciprocations securing the series adjacent one end of the drum, and expanding the pulley-band carcass so formed into tire form.

8. The method of building a pulley band tire carcass, comprising; guiding a circumferential series of cord members in taut condition through a guiding circumference, securing said series to a substantially flat drum coaxial with the guiding circumference and of sufficient width to support a pulley band carcass in flat condition, repeatedly causing relative axial reciprocation between the guiding circumference and the drum whereby the drum is located first on one side and then on the other of the guiding circumference, causing relative rotation between the drum and the guiding circumference concurrently with said reciprocations whereby the elements are laid diagonally over the drum in a zig-zag path, and alternately with said reciprocations securing the series adjacent one end of the drum, and expanding the pulley-band carcass so formed into tire form.

9. The method of building a pulley-band tire carcass, comprising; providing spaced bead supports affording sufficient axial distance between them for the width desired in the unexpanded pulley-band carcass, guiding a circumferential series of cord members in taut condition from a circumference greater than that of the bead supports and coaxial therewith, holding the series of cord members adjacent one of said bead supports, causing relative reciprocation between the supports and the guiding circumference and concurrently therewith causing relative rotation between them in such a manner that the cord members will be drawn diagonally between the supports and will extend beyond the second support in straight lines between it and the guiding circumference with the whole series of cord members defining a warped surface having a portion with a circumference sufficiently small to permit of an annular anchorage being applied in encircling relation to the series, causing relative reciprocation between the supports and the guiding circumference, whereby the encircling anchorage will be drawn adjacent the second-named bead support and the series of cord members will be laid between the supports in a second layer, and repeating the relative reciprocations in successively reversed directions and alternately therewith securing the cord members adjacent one of the supports until a pulley-band carcass having the desired number of plies is built up, and expanding the pulley-band carcass into tire form.

10. The method of building a pulley-band tire casing, comprising; providing a substantially flat building drum having supports at each end for the reception of the bead portions of the carcass, holding adjacent one of said supports a circumferential series of cord members, laying the series across the drum and beyond it so that they project past the drum to define a surface having a circumference at least as small as the bead supports, encircling the surface with an annular bead anchorage, and drawing the cord members around the anchorage and back under tension towards the drum, whereby the anchorage is positioned adjacent the other of said supports, and expanding the pulley-band carcass into tire form.

11. The method of building a tire casing, comprising; constructing a pulley-band carcass out of a circumferential series of spaced cord members each carrying at its surface an excess of rubber, adding such covering material as desired, expanding the carcass to tire form, and vulcanizing the casing under heat and pressure whereby the excess rubber will flow into the spaces between the elements.

12. The method of building a tire casing, comprising; folding each of a circumferential series of separate cord members about an annular anchorage, holding the anchorage adjacent one of two axially spaced circular bead supports, carrying the series adjacent the second bead support to define a substantially cylindrical surface, securing the series adjacent the second support by an encircling annular anchorage, folding the members about the second-named anchorage and carrying them back towards the first-named support to form a second ply, repeating the securing and carrying operations alternately until a carcass having the desired number of plies is built up, securing the members in the final ply by folding them upon themselves around an annular anchorage, adding such covering material as may be desired, expanding the substantially cylindrical laminated band so formed into tire form, and vulcanizing the band in its expanded form.

13. The method of making laminated cord fabric in flat form which consists in anchoring the ends of a series of cord members around one circumference, drawing said members into cylindrical form, and anchoring them at another circumference.

14. The method of making laminated cord fabric in flat form which consists in anchoring cord members around a circle to form a circumferential series, drawing said members into cylindrical form, anchoring them around a circle spaced from the first, drawing them back and forth between said circles and anchoring them alternately at said circles.

15. The method of making a flat pulley band which consists in anchoring cord members around a circle at one side of a flat pulley support, drawing said members under tension across said support and to a less diameter at the other side of the same, anchoring the members at the other side and then drawing the members in a like manner back across the support and again anchoring at the first side of the support whereby a complete ply is formed each time the cord members are thus drawn across the support.

16. A pulley-band structure composed of a plurality of superposed reversely folded courses of a circumferential series of separate cord members.

17. A pulley-band structure composed of a plurality of superposed reversely folded courses of a circumferential series of separate cord members, the members in each course being continuations of those in the course directly adjacent.

18. A pulley-band structure composed of a plurality of superposed reversely folded courses of a circumferential series of separate cord members, the members in each course being continuations of those in the course directly adjacent and each fold of the series of members enclosing an annular anchorage.

19. A pulley-band structure composed of a plurality of superposed reversely folded courses of a circumferential series of separate cord members, the members in each course being continuations of those in the course directly adjacent, and lying at different angles in the several plies.

THOMAS MIDGLEY.